3,025,168
PRESERVATION OF CANNED MEATS
Richard A. Greenberg, Chicago, Ill., assignor to Swift & Company, Chicago, Ill., a corporation of Illinois
No Drawing. Filed Mar. 9, 1959, Ser. No. 797,894
10 Claims. (Cl. 99—187)

This invention relates in general to a method for stimulating bacterial spores to germinate. More particularly, the invention is directed to a method of processing food products containing bacterial spores in order to lower the spoilage potential of the food. The invention is especially applicable in the preparation of foods which receive a heat processing treatment as part of their preparation. The present invention also includes the novel product produced in accordance with the method of the instant invention.

Nonsporing microorganisms and germinated (vegetative) cells of spore-bearing microorganisms are readily destroyed by thermal processing at relatively low temperatures, e.g. pasteurization temperatures. However, the heat-resistant bacterial spore is a problem to the food manufacturer. Such spores do not carry on detectable metabolic activity, but survive pasteurization temperatures and can subsequently germinate and cause spoilage and/or pathogenic hazards. Because of its resistance to heat, the bacterial spore is a troublemaker in other fields as well as food processing, for example, in maintaining sterilization conditions in surgery.

Spore formation is a distinguishing feature of organisms of the family Bacillaceae of which there is an aerobic genus (Bacillus) and an anaerobic genus (Clostridium). The spores of several species of Clostridia are particularly worrisome to the food manufacturer because many of them, upon germinating, cause spoilage and one species, Clostridium botulinum, is pathogenic.

In order to destroy these heat-resistant spores, it is the usual practice in the canning of foods to place the food product in cans, jars, or other containers, seal the containers, and then subject the product to a processing operation generally involving heating the product in hot or boiling water or exposing the canned product to steam under pressure for a time sufficient to destroy the pathogenic and spoilage organisms. Therefore, the problem of the canner reduces to one of determining the time necessary and the temperature required inside the can to produce a desirable product which will be free from bacterial growth during prolonged storage at any temperature.

Being a function of a time-temperature relationship, the thermal destruction of bacteria will take place in a shorter time at high temperatures than is required at lower temperatures. An example of a typical safe cook for a whole chicken product in a 404 x 700 can would be 80 minutes in a retort at a temperature of 240° F. While this cooking treatment will destroy the microorganisms and spores thereof, such high temperatures and lengthy cooks are time consuming and produce quality loss in the product with respect to flavor, texture, and general appearance. Therefore, any method by which a food product with lowered spoilage potential can be prepared in less time or at decreased temperatures is desirable both from the standpoint of handling by the manufacturer and acceptability by and safety for the ultimate consumer.

It is, therefore, an object of the present invention to provide a method of stimulating, forcing, or inducing bacterial spores to germinate to the less destruction-resistant vegetative state.

An additional object of the present invention is to provide a method for controlling bacterial growth in food products which contain bacterial spores and which will be subjected to a preservation step, such as heat treatment, low level irradiation, and/or chemical preservatives, etc.

A further object of the invention is to provide a method for producing a shelf-stable food product of good quality without subjecting the product to undesirably high temperatures for prolonged periods of time.

Still another object of the present invention is to provide a method for forcing germination of bacterial spores whereby undesirable microorganisms can be more easily destroyed by subsequent preservation operations.

Further objects and advantages will become apparent to one skilled in the art from the following description of the invention.

I have discovered that by incorporating a small but effective amount of a gibberellin in a medium containing bacterial spores, germination of such spores is stimulated. By treating the spore-containing medium in this manner it is possible to subsequently subject the medium to a far less severe preservation step than is usual for preparing a bacteria-free product.

The gibberellins are the metabolic products of the rice disease producing fungus, *Gibberella fujikuroi*. Gibberellin is produced in a manner similar to that used in preparing antibiotics; that is, fungus cultures are grown in fermentation tanks and the gibberellin is extracted and purified. They are described in the Gibberellin Fact Book, trade publication AIP–47, published by the Agricultural & Industrial Products Division of Eli Lilly and Company in about 1958. A particularly effective form of gibberellin, and one eminently suitable for use in practicing my invention is gibberellic acid the molecular formula of which is $C_{19}H_{22}O_6$ and the structural formula of which is believed to be Other members of the gibberellin family that may be used are gibberellin A, ($[\alpha]D+36°$, $C_{19}H_{24}O_6$) gibberellin B, and salts of gibberellic acid.

I have found that a very small amount of gibberellic acid, less than .1 p.p.m. of the bacterial spore-containing medium is required to stimulate germination of the spores. Larger amounts may be used; however, the results obtained are not sufficiently increased to warrant the cost of using amounts much in excess of about 10–20 p.p.m., with perhaps about .1 p.p.m. being optimum.

The gibberellin is effective substantially instantaneously upon contact with the spores. However, it is necessary that there be actual contact and to this extent there is a practical problem of dispersing the gibberellin throughout the medium containing the bacterial spores. The particle size and chemical makeup of the medium, type and number of spores present, method of incorporating the gibberellin, temperature, etc., will dictate the length of time that the gibberellin should be maintained in contact with the medium containing the spores in order to force germination thereof. For example, in a regular canning procedure, the time lapse between placing product in the container and retorting the product is sufficient to allow dispersion of the gibberellin throughout the product to stimulate wakening of the dormant spore to the vegetative form of the bacterium. In this vegetative stage the product can be rendered shelf-stable (i.e. capable of resisting microbiological spoilage at any temperature of storage) by heat treatment at relatively low temperatures, e.g. at temperatures high enough to destroy molds, yeasts, and bacteria, yet far lower than would normally by required to destroy the spore forms of bacteria. At these lower temperatures purging of juices and fats is minimized and good appearance, flavor and texture of the food is maintained. A typical time lapse in normal canning operations between placing the product and the gibberellin in the container and retorting the product is about 30 minutes. However, the contact time in this type operation is a function of the mixing efficiency with which the gibberellin is dispersed in the product and could be substantially reduced were the product and gibberellin subjected to a high-speed mixing operation.

If it is desired to subject the product to a heat preservation step, the heating operation to which the treated product is subjected will depend upon the equipment used (e.g. the size of the can), the temperature employed, and the length of time the product is maintained at the particular temperature. Time of the heating operation will generally vary inversely with the temperature used. In general, retort temperatures ranging between about 160° F. and 290° F. for periods of time between about several hours and a few seconds respectively, will destroy the bacterial population of the product and insure a shelf-stable product with lowered spoilage potential due to the absence of spore flora. As will be mentioned more specifically in connection with the example, the retort temperature is distinct from the temperature at the center of the product. The above retort temperatures will both attain a center temperature sufficient to destroy the bacterial population, the variable being the time required to attain the desired center temperature.

The following example is illustrative only and should not be construed as imposing limitations on the invention other than as set forth in the appended claims.

*Example I*

A quantity of a raw, cured meat emulsion was inoculated with about 100 aerobic spores per gram of product and about 500 putrefactive anaerobic spores per gram of product. The spore-inoculated meat emulsion was divided into five equal portions. One portion was used as a control, while to the others, 1, 5, 10, and 20 p.p.m. of gibberellic acid were added. The product was stuffed in 300 x 308 cans, and two different heat processing operations were carried out. Half of the cans were processed in a retort for 35 minutes at 235° F., and the other half were processed for 50 minutes at 235° F. (It should be noted that 235° F. is the temperature of the retort. After about 35 minutes in the retort at this temperature, the product will probably attain a temperature of about 185° F. at the center thereof.) All of the cans were incubated at 100° F. The spoilage results after 141 days at the incubation temperature are as follows:

| Gibberellic Acid (p.p.m.) | Retort Time and Temperature | |
|---|---|---|
| | 35 Min. at 235° F., Percent Spoilage | 50 Min. at 235° F., Percent Spoilage |
| 0 (Control) | 73 | 44 |
| 1 | 20 | 0 |
| 5 | 18 | 13 |
| 10 | 28 | 0 |
| 20 | 20 | 7 |

Statistical analysis of the above data reveal that the results are very significant, at any level of gibberellic acid used, with regard to spoilage from all causes. When it is remembered that the product treated in the above example had been inoculated with 500 putrefactive anaerobic spores per gram of product, whereas the usual anaerobic spore contamination of meat products is less than 1 per gram (see Burke, Steinkraus and Ayers, "Method for Determining the Incidence of Putrefactive Anaerobic Spores in Meat Products," Food Technology, vol. 4, pp. 21–25, 1950) the effectiveness of gibberellin in increasing shelf-stability in a thermally processed food product is seen to be very great indeed. Amounts less than one part per 10 million have also proven effective in controlling spoilage in food products.

While the above example is concerned with a meat-containing product, it should be recognized that any medium suspected of containing bacterial spores can be effectively treated with the gibberellins to cause the spores to germinate. In the less resistant vegetative state, the bacteria are much more susceptible to the usual methods of destruction. Examples of other products that can be advantageously treated prior to a further preservation step are fresh meat and poultry, soups, spaghetti, chili con carne, hash, baby foods, etc.

Obviously, many modifications and variations of the invention as hereinbefore set forth may be made without departing from the spirit and scope thereof, and therefore only such limitations should be imposed as are indicated in the appended claims.

I claim:

1. In the treatment of a food medium containing bacterial spores, the method of stimulating said spores to germinate which comprises: incorporating in said medium a small amount of gibberellin, and dispersing said gibberellin throughout said medium whereby to contact said spores with said gibberellin.

2. In the treatment of a food medium containing bacterial spores, the method of stimulating said spores to germinate which comprises: adding to said medium a small amount of a gibberellin, and maintaining said gibberellin in contact with said medium for a sufficient time to cause said spores to germinate.

3. A method of controlling bacterial growth in a food product thought to contain bacterial spores which comprises: contacting said spores with a small amount of gibberrillin, and subjecting said food product to an additional preservation step.

4. A method of controlling bacterial growth in a food product thought to contain bacterial spores which comprises: adding to said food product a small amount of a gibberellin, maintaining said gibberellin in contact with said food product for a sufficient time to cause said spores to germinate, and subjecting said food product to an additional preservation step.

5. A method of preserving a food product comprising: incorporating in said food product a small amount of a gibberellin whereby to cause any bacterial spores contained in said product to germinate, enclosing said product in a hermetically sealed container, and elevating the temperature of said container sufficiently to destroy the bacterial population of said product.

6. In a canning process wherein a food product confined in a sealed container is subjected to a heat treatment to destroy spoilage bacteria, the improvement comprising: adding a small amount of gibberellin to said product thereby forcing any spores of said bacteria that may be present in said product to germinate and decreasing the thermal processing required to destroy said bacteria.

7. A method for lowering the thermal resistance of the bacterial flora contained in a food product to be subjected to a heat preservation operation whereby the time and temperature necessary to produce a shelf-stable product is decreased and flavor damage is lessened, which comprises: adding to said food product an amount of a gibberellin sufficient to cause spores indigenous to said product to germinate.

8. The method of preserving a meat-containing food product which comprises: incorporating in said product an amount of gibberellic acid sufficient to cause any bacterial spores contained in said product to germinate, enclosing said product in a hermetically sealed container, and elevating the temperature of said container to destroy the bacterial population of said product.

9. The product produced in accordance with the method of claim 1.

10. A method for lowering the thermal resistance of the bacterial flora contained in a cured meat-containing product to be subjected to a heat preservation operation whereby the time and temperature necessary to produce a shelf-stable product is decreased and flavor damage is lessened which comprises: adding to said cured meat-containing product an amount of a gibberillin sufficient to cause spores indigeneous to said product to germinate.

References Cited in the file of this patent

UNITED STATES PATENTS 2,842,051    Brian et al.  --------------- July 8, 1958

FOREIGN PATENTS 501,707    Canada  --------------- Apr. 20, 1954

OTHER REFERENCES

"Agricultural Chemicals," April 1957, pages 30 and 31, article entitled Gibberellic Acid.

"Science," Oct. 11, 1957, page 701.

"Chemical Abstracts," Oct. 25, 1958, page 17596, article entitled Uses of Gibberellic Acid.

UNITED STATES PATENT OFFICE
CERTIFICATION OF CORRECTION

Patent No. 3,025,168                          March 13, 1962

Richard A. Greenberg

It is hereby certified that error appears in the above numbered patent requiring correction and that the said Letters Patent should read as corrected below.

Column 1, line 30, for "Spore" read -- Spore --, line 42, for "boling" read -- boiling --; line 31, the proper name "Bacillaceae" should appear in italics; line 32, the proper names "Bacillus" and Clostridium" should appear in italics; column 2, lines 28 and 29, "Gibberellin Fact Book" should appear in italics; same column 2, line 45, after "O$_2$" insert a closing parenthesis; column 3, line 4, for "by" read -- be --; column 5, line 13, for "indigeneous" read -- indigenous --.

Signed and sealed this 3rd day of July 1962.

(SEAL)
Attest:

ERNEST W. SWIDER
Attesting Officer

DAVID L. LADD
Commissioner of Patents